Patented Nov. 24, 1931

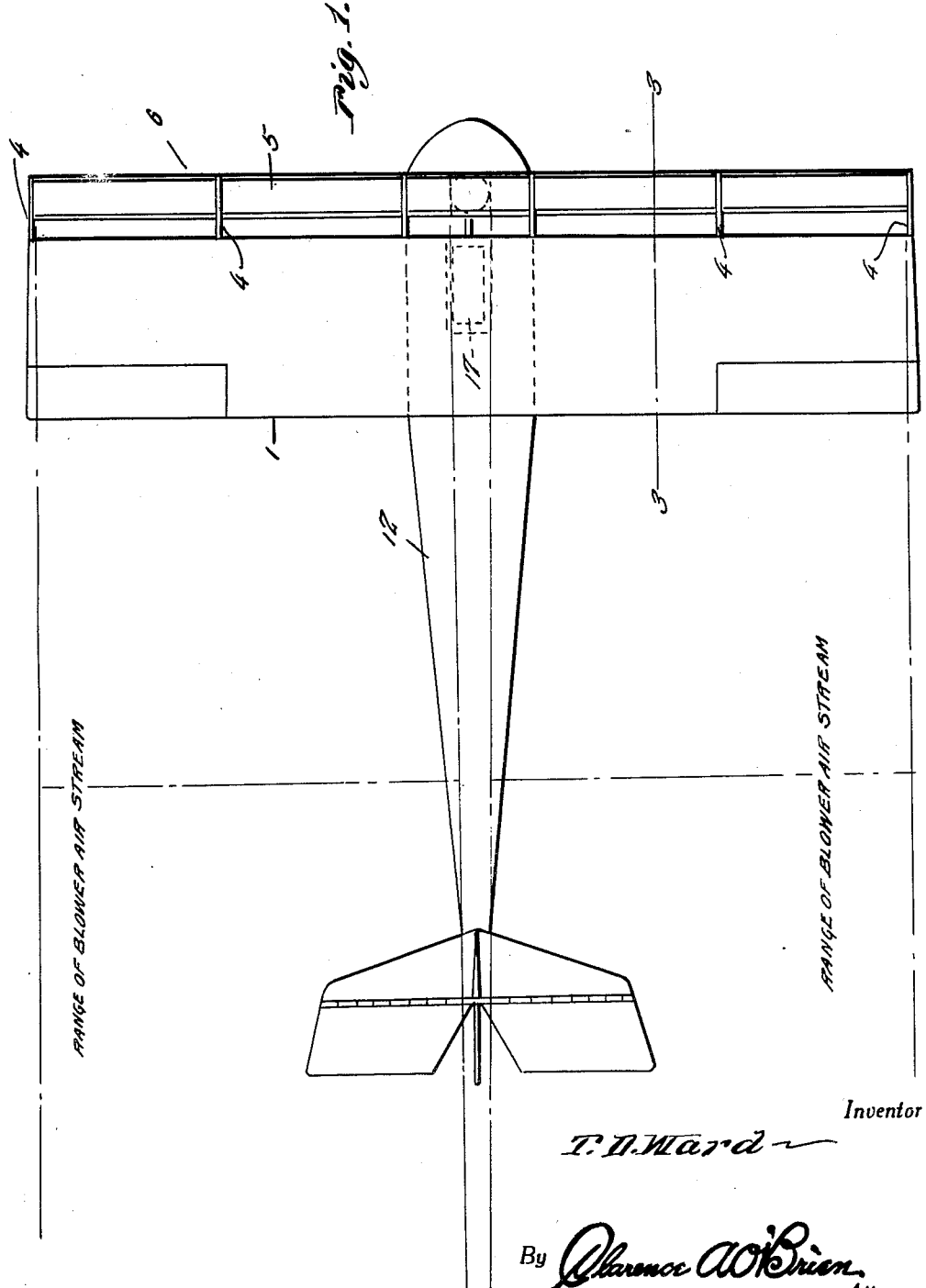

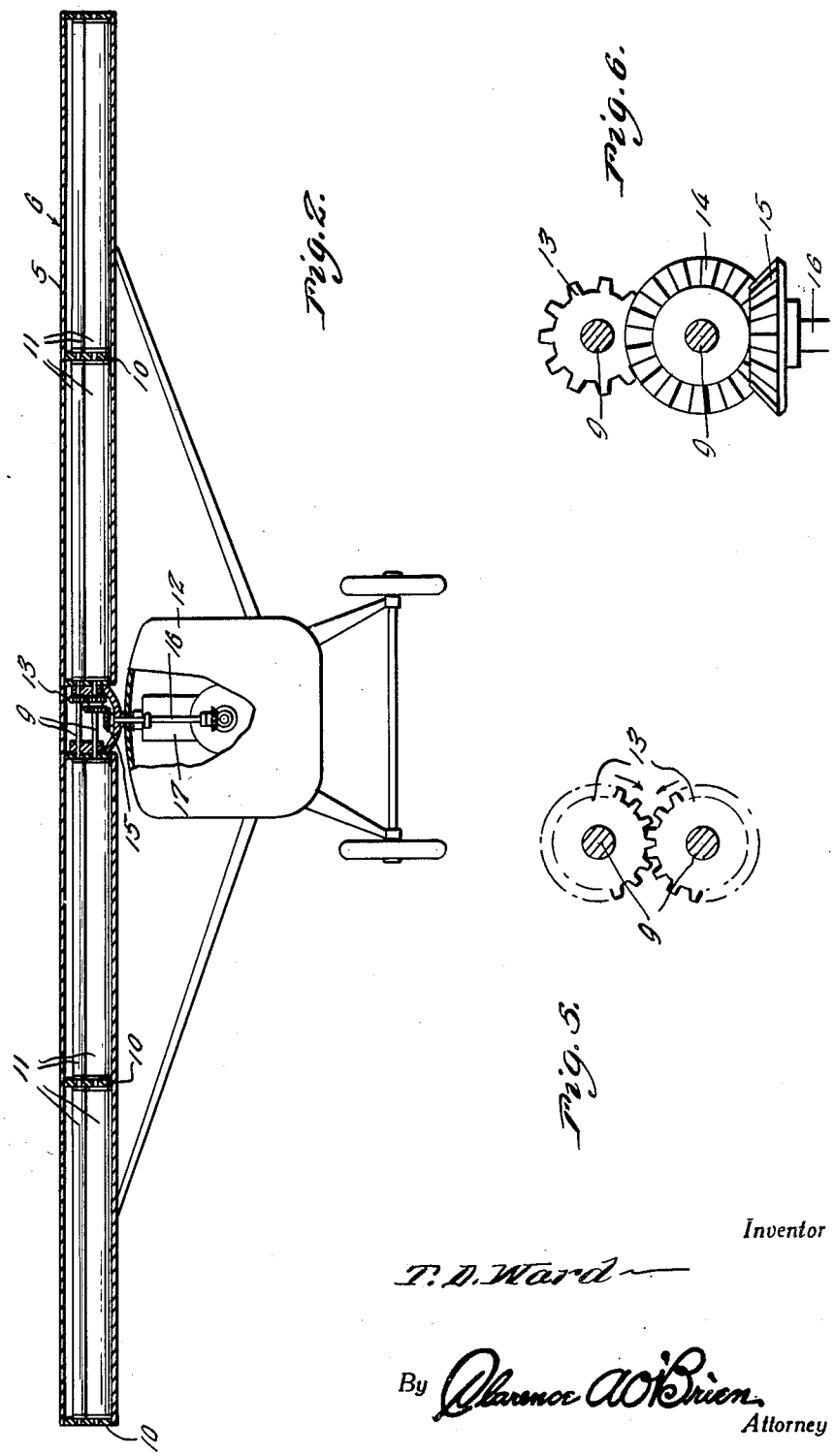

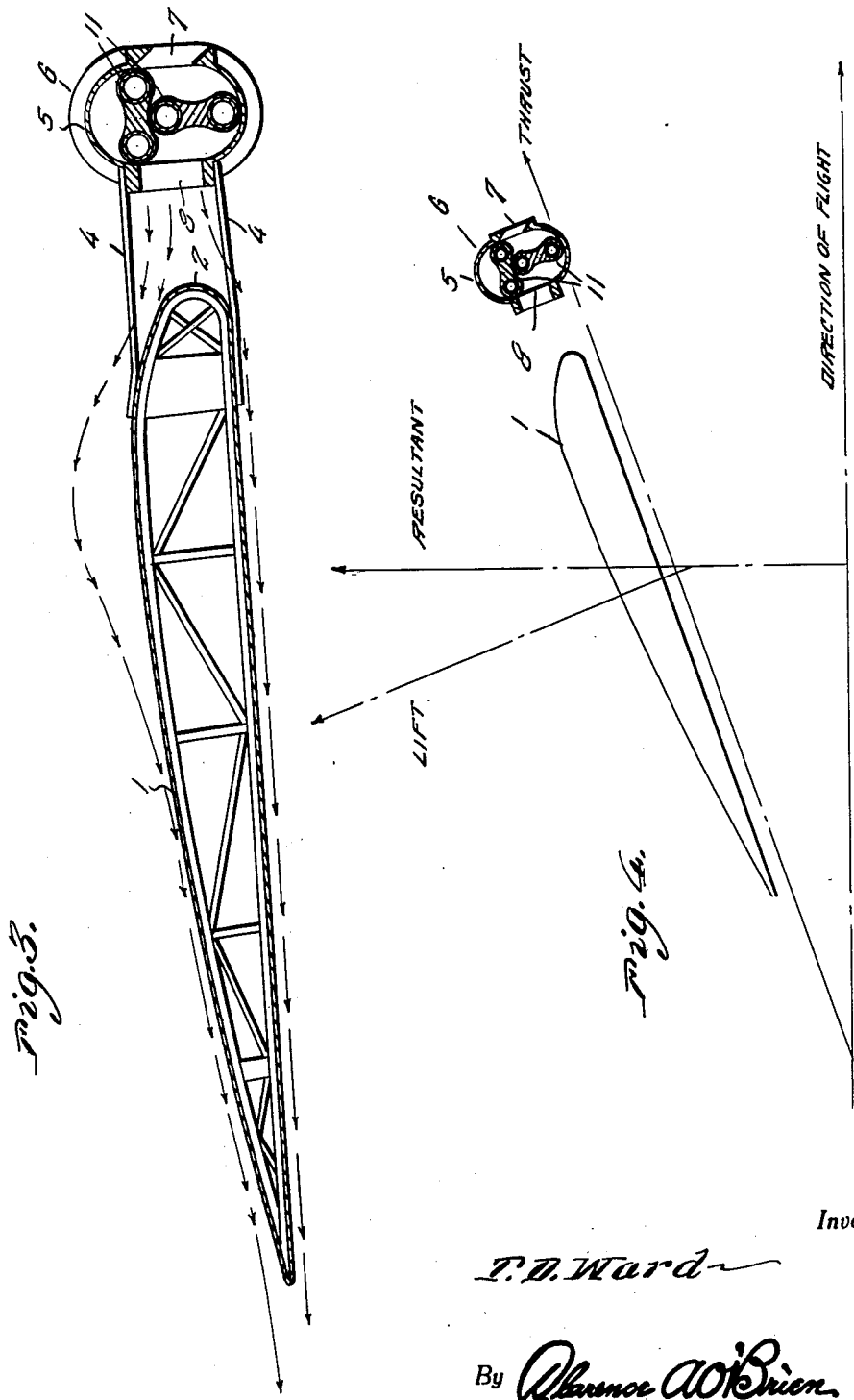

1,833,600

UNITED STATES PATENT OFFICE

THOMAS D. WARD, OF NEW ALBANY, INDIANA

AEROPLANE

Application filed October 16, 1930. Serial No. 489,167.

This invention relates to aeroplanes and has for its primary object to provide, in a manner as hereinafter set forth, an aeroplane embodying novel means whereby the aeroplane may be caused to ascend or descend in a vertical plane or be sustained motionless in the air should it be so desired.

Another important object of the invention is to provide means for attachment to aeroplanes of conventional construction for causing said aeroplanes to ascend or descend in a vertical plane without the necessity of materially altering the construction of the aeroplane.

Other objects of the invention are to provide an aeroplane of the character set forth which will be simple in construction, strong, durable, efficient and reliable in operation and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a top plan view of an aeroplane constructed in accordance with this invention.

Figure 2 is a view in vertical section through the air blowers which are mounted forwardly of the entering or leading edge of the wings of the aeroplane.

Figure 3 is a vertical longitudinal sectional view taken substantially on the line 3—3 of Figure 1.

Figure 4 is a diagrammatic view illustrating the direction of the two forces exerted on the aeroplane wing which causes said wing to be moved in a vertical plane or sustained motionless in the air.

Figure 5 is a detail cross sectional view showing the gears which operatively connect the rotary shafts of the impellers together.

Figure 6 is an enlarged detail view showing the gearing connection on the vertical drive shaft which is driven by an engine to one of the impeller shafts of the air blowers.

Referring to the drawings in detail, it will be seen that the reference numeral 1 designates a wing which may be of conventional construction and configuration and which includes the entering or leading edge 2 and the trailing edge 3. Rigidly secured to the upper and lower sides of the forward portion of the wing 1 are the pairs of forwardly projecting upper and lower arms 4 between the forward ends of which is mounted a housing or casing 5 of an air blower which is designated generally by the reference numeral 6. The blower 6 is substantially co-extensive with the fan of the wing 1. The housing 5 is provided with an air intake opening 7 in its front wall and with an air outlet opening 8 in its rear wall.

Upper and lower shafts 9 are journaled in the plates 10 which are spaced in the housing 5 and fixed on each of the shafts 9 between the plates 10 are suitable co-acting impellers 11.

At a point above the fuselage 12 of the aeroplane the shafts 9 have fixed thereon the meshed gears 13 which operatively connect the shafts together for rotation in unison. Also fixed on the lowermost of the shafts 9 is a beveled gear 14 which meshes with a beveled gear 15 fixed on the upper end portion of a vertical rotary shaft 16 which is operatively connected to the engine 17 in the fuselage 12 into which the vertical shaft 16 extends.

In operation, the blower 6 drives a stream of air rearwardly through the outlet opening 8 against the entering or leading edge 2 of the wing 1 and the major portion of the stream of air passes over the wing 1 in the manner indicated by the arrows in Figure 3 of the drawings. The lifting force thus created above the wing 1 is in a direction substantially at right angles to the wing, as indicated in Figure 4 of the drawings. Then, the forward thrust on the wing is in a direction in longitudinal alignment with the wing regardless of the angle of said wing and the two forces neutralize each other with the result that a vertical lifting force is exerted on the wing. As the stream of inclination of the wing is reduced toward a horizontal plane the forward thrust progressively overcomes the lift thrust and the wing moves forward in the direction of flight.

It is believed that the many advantages of an aeroplane constructed in accordance with this invention will be readily understood, and although the preferred embodiment of the invention is as illustrated and described, it is to be understood that changes in the details of construction may be had which will fall within the scope of the invention as claimed.

What is claimed is:—

1. In an aeroplane having a fuselage, a wing mounted transversely on the fuselage and a power plant in the fuselage, an elongated casing rigidly mounted in spaced relation forwardly of the leading edge of the wing and of a length substantially co-extensive with the span of the wing, said casing having an air inlet opening in its forward wall and an air outlet opening in its rear wall, shafts mounted for rotation in the casing, co-acting air impellers fixed on the shafts for actuation thereby and adapted to drive a stream of air rearwardly against the leading edge of the wing and over the top of said wing in a manner to exert a lifting force thereon when the aeroplane is stationary, and means operatively connecting the shafts to the power plant for actuation by said power plant.

2. In an aeroplane having a fuselage, a wing mounted transversely on the fuselage and a power plant in the fuselage, pairs of upper and lower arms fixed on the upper and lower sides of the forward portions of the wing and projecting forwardly therefrom, an elongated casing mounted between the forward end portions of the pairs of arms, said casing of a length substantially co-extensive with the span of the wing and spaced from the leading edge of the wing, said casing having an air inlet opening in its forward wall and an air outlet opening in its rear wall, upper and lower shafts mounted for rotation in the casing, pairs of co-acting air impellers fixed on the upper and lower shaft and adapted to drive a stream of air rearwardly against the leading edge of the wing and over said wing in a manner to exert a lifting force thereon when the aeroplane is stationary, bearing plates mounted in spaced relation in the casing between the pairs of impellers for rotatably supporting the shafts, and means operatively connecting the shafts to the power plant for actuation by said power plant.

3. In an aeroplane having a fuselage, a wing mounted transversely on the fuselage and a power plant in the fuselage, pairs of upper and lower arms fixed on the upper and lower sides of the forward portion of the wing and projecting forwardly therefrom, an elongated casing mounted between the forward end portions of the pairs of arms, said casing of a length substantially co-extensive with the span of the wing and spaced from the leading edge of the wing, said casing having an air inlet opening in its forward wall and an air outlet opening in its rear wall, upper and lower shafts mounted for rotation in the casing, pairs of co-acting air impellers fixed on the upper and lower shafts and adapted to drive a stream of air rearwardly against the leading edge of the wing and over said wing in a manner to exert a lifting force thereon when the aeroplane is stationary, bearing plates mounted in spaced relation in the casing between the pairs of impellers for rotatably supporting the shafts, and means operatively connecting the shafts to the power plant for actuation by said power plant, said means comprising a vertical shaft operatively connected to the power plant for actuation thereby, meshed beveled gears fixed on the lowermost of the first named shafts, and on the upper end of the vertical shaft, and meshed gears fixed on the intermediate portions of the upper and lower shafts for operatively connecting said shafts together for rotation in unison.

In testimony whereof I affix my signature.

THOMAS D. WARD.